(12) United States Patent
Blair et al.

(10) Patent No.: US 11,097,628 B2
(45) Date of Patent: Aug. 24, 2021

(54) ENERGY TRANSMISSION AND CONTROL SYSTEM AND COMMUNICATIONS DEVICE

(71) Applicant: Conductix, Inc., Omaha, NE (US)

(72) Inventors: Martin Blair, Gretna, NE (US);
Roland Lawson, Omaha, NE (US);
Michael Andrew Dierks, Omaha, NE (US)

(73) Assignee: Conductix, Inc., Omaha, NE (US)

( * ) Notice: Subject to any disclaimer, the term of this patent is extended or adjusted under 35 U.S.C. 154(b) by 0 days.

(21) Appl. No.: 16/940,690

(22) Filed: Jul. 28, 2020

(65) Prior Publication Data
US 2020/0353827 A1 Nov. 12, 2020

Related U.S. Application Data

(63) Continuation of application No. 16/257,344, filed on Jan. 25, 2019, now abandoned.

(60) Provisional application No. 62/621,747, filed on Jan. 25, 2018.

(51) Int. Cl.
*B60L 53/16* (2019.01)
*H01R 13/66* (2006.01)
*B66C 13/12* (2006.01)
*H04B 3/54* (2006.01)

(52) U.S. Cl.
CPC .............. *B60L 53/16* (2019.02); *B66C 13/12* (2013.01); *H01R 13/665* (2013.01); *H04B 3/54* (2013.01)

(58) Field of Classification Search
None
See application file for complete search history.

(56) References Cited

U.S. PATENT DOCUMENTS

| | | | |
|---|---|---|---|
| 9,260,024 B1* | 2/2016 | Lau | B60L 53/14 |
| 2011/0284700 A1* | 11/2011 | Brand | B61L 15/0036 |
| | | | 246/28 R |
| 2013/0134938 A1* | 5/2013 | Bianco | B60L 53/16 |
| | | | 320/109 |
| 2014/0192910 A1* | 7/2014 | Okada | B60L 53/22 |
| | | | 375/258 |
| 2019/0225104 A1* | 7/2019 | Blair | H01R 13/665 |

* cited by examiner

*Primary Examiner* — David V Henze-Gongola
(74) *Attorney, Agent, or Firm* — Ryan T. Grace; Advent, LLP

(57) ABSTRACT

An energy transmission and control system includes a power supply, a conductive support to electrically couple to the power supply, and a vehicle to electrically couple to the conductive support to receive electrical energy from the power supply. The conductive support can be configured to support the vehicle for travel along the conductive support and to transmit the electrical energy from the power supply to the vehicle. The electrical circuit can be configured to transmit a communications signal at a low frequency of about five hundred kilohertz or less. The vehicle can include a translating contact for electrically coupling the vehicle to the conductive support, a switch for selectively transmitting the electrical energy from the power supply to an electrically powered element or subsystem, and a controller to receive the communications signal and operate the switch to selectively transmit the electrical energy to the electrically powered element or subsystem.

20 Claims, 10 Drawing Sheets

ENERGY TRANSMISSION AND CONTROL SYSTEM AND COMMUNICATIONS DEVICE

CROSS-REFERENCE TO RELATED APPLICATIONS

The present application is a continuation under 35 U.S.C. § 120 of U.S. patent application Ser. No. 16/257,344, filed Jan. 25, 2019, and titled "ENERGY TRANSMISSION AND CONTROL SYSTEM AND COMMUNICATIONS DEVICE," which claims the benefit under 35 U.S.C. § 119(e) of U.S. Provisional Application Ser. No. 62/621,747, filed Jan. 25, 2018, and titled "ENERGY TRANSMISSION AND CONTROL SYSTEM AND COMMUNICATIONS DEVICE." U.S. patent application Ser. No. 16/257,344 and U.S. Provisional Application Ser. No. 62/621,747 are herein incorporated by reference in their entireties.

BACKGROUND

Control switches can be used to control industrial equipment, such as overhead cranes. Such switches can be board mounted, wall mounted, floor mounted, and so forth. Limit switches can also be used to limit the movement and/or operation of such equipment.

DRAWINGS

The Detailed Description is described with reference to the accompanying figures. The use of the same reference numbers in different instances in the description and the figures may indicate similar or identical items.

DETAILED DESCRIPTION

Figure 1:
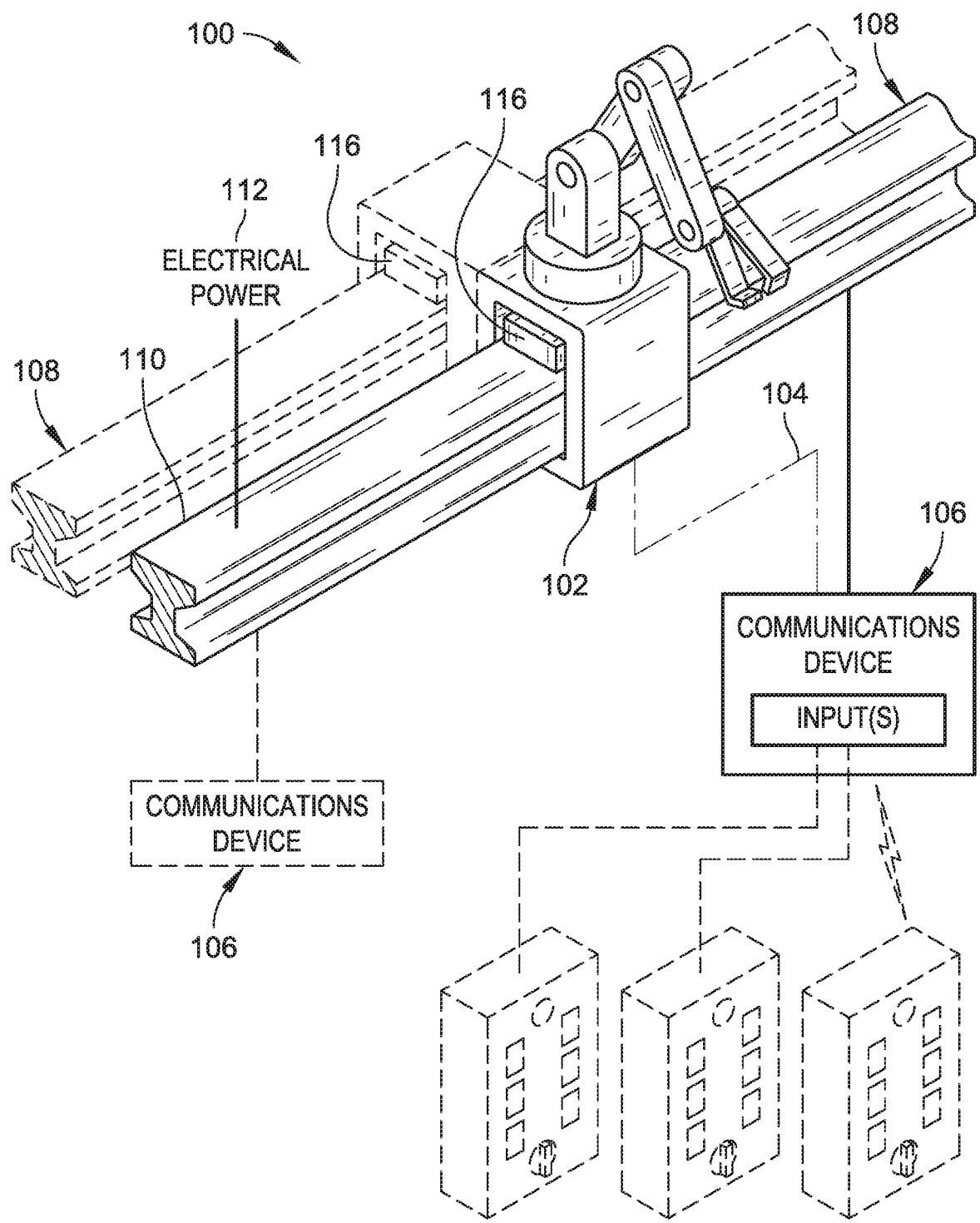
FIG. 1 is a diagrammatic illustration of an energy transmission and control system that includes communications devices mated together to form virtual physical layer connections in accordance with example embodiments of the present disclosure.
Figure 2:
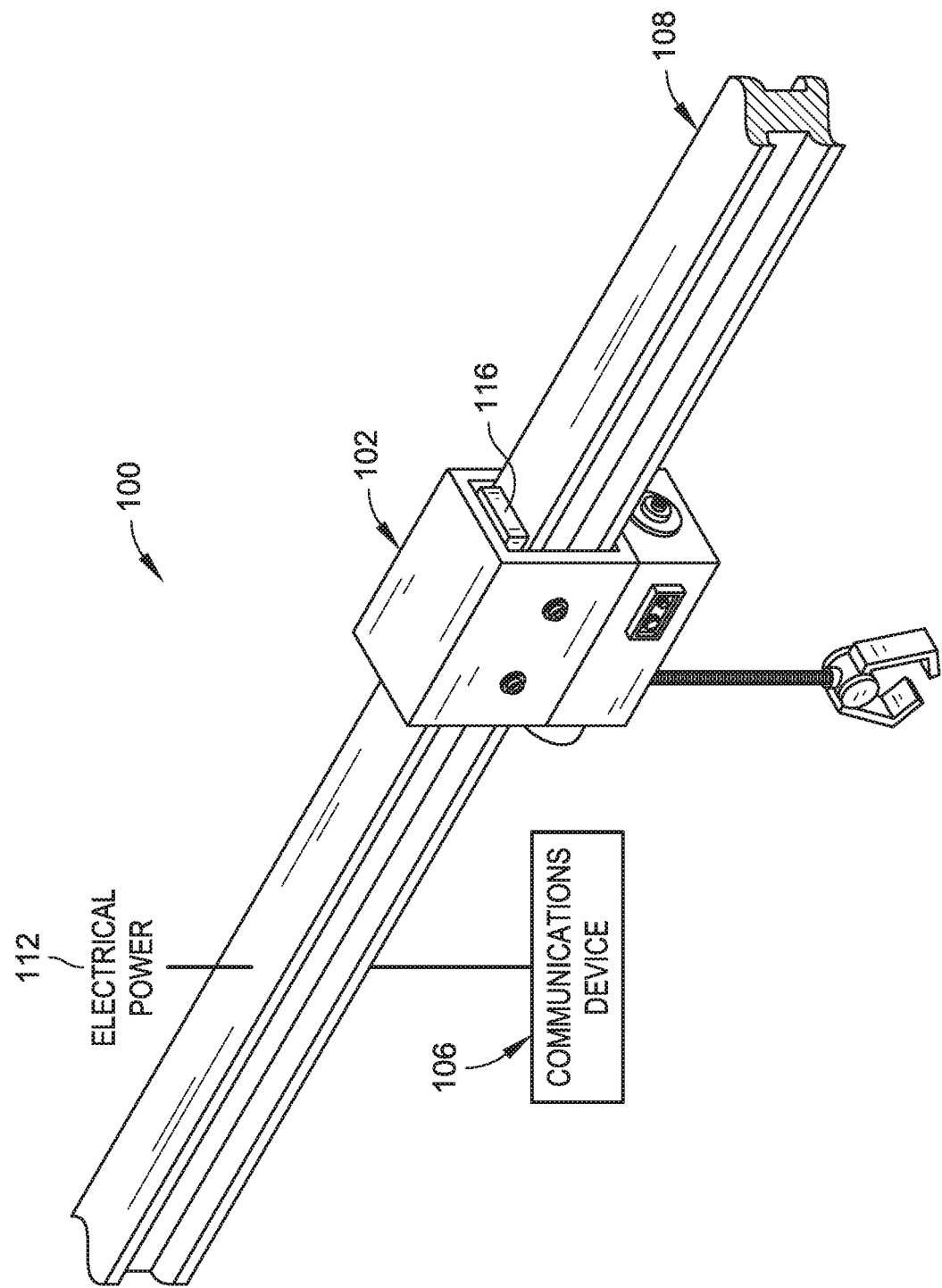
FIG. 2 is another diagrammatic illustration of an energy transmission and control system in accordance with example embodiments of the present disclosure.
Figure 3:
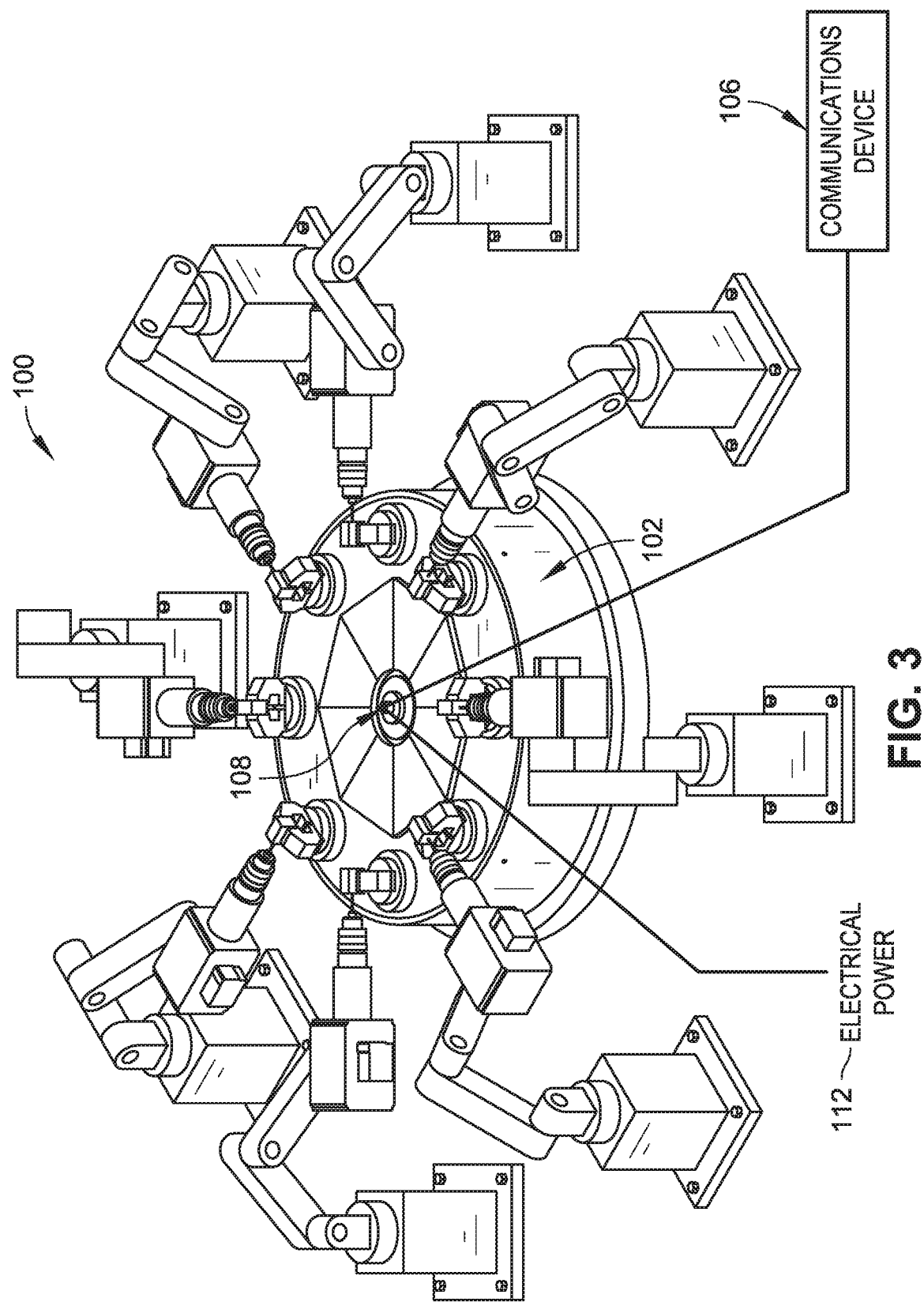
FIG. 3 is a further diagrammatic illustration of an energy transmission and control system in accordance with example embodiments of the present disclosure.

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. The following detailed description is, therefore, not to be taken in a limiting sense.

Referring generally to FIGS. 1 through 10, energy transmission and control systems 100 are described. The energy transmission and control systems 100 can be used to provide one or more vehicles 102 with virtual wire/virtual cable/virtual physical layer connections 104 that operatively couple the vehicles 102 with one or more communications devices 106 and/or with one another through a conductive support 108 also used to deliver electrical power to the vehicle 102 through conductive material forming the conductive support 108 (e.g., steel rail or another conductive material). The systems and techniques described herein can be used in various applications (e.g., in place of, or in addition to, actual wires/actual cables/actual physical layer connections). These applications can include, but are not necessarily limited to, applications that would otherwise require festoons and/or other actual physical cables to connect vehicle components to control hardware, such as overhead cranes, electric suspension railways, automatically controlled industrial trucks, automated warehouse robots, dark rides, and so forth.

The energy transmission and control systems 100 allow for continuous communications through a conductor network 110 established using the conductive support 108. For example, the conductive support 108 is electrically coupled to a power supply 112 (e.g., via an alternating current (AC) power bus 114) and transmits electrical energy supplied from the power supply 112 to the conductive support 108. In embodiments of the disclosure, the power supply 112 can be configured as an energy storage device (e.g., a battery, a fuel cell), an electromechanical system (e.g., a generator, an alternator, a convertor, etc.), AC mains, and/or another type of power supply. In some embodiments, the conductive support 108 can be configured as a conductive rail (e.g., as shown with reference to FIGS. 1 and 2), a conductor bar, a slip ring (e.g., as shown with reference to FIGS. 3 and 4), a cable reel (e.g., as shown with reference to FIG. 5), and so forth. In some embodiments, the conductive support 108 can be configured as a cable with a reduced number of conductors (e.g., a single conductor wire carrying both electrical power and communications signals).

An energy transmission and control system 100 also includes one or more vehicles 102 to electrically couple to the conductive support 108 to receive electrical energy supplied from the power supply 112. As described herein, a conductive support 108 is configured to support the vehicle 102 for travel along the conductive support 108 and to transmit electrical energy from the power supply 112 to the vehicle 102 along the conductive support 108 as part of an electrical circuit established between the power supply 112 and the vehicle 102 through the conductive support 108. For instance, a vehicle 102 can include wheels, skids, and/or other mechanisms for translating along the conductive support 108. The vehicle 102 can also include a translating contact 116, e.g., a sliding collector shoe, a rolling collector, or another collector for electrically coupling the vehicle 102 to the conductive support 108 by riding along in contact with the conductive support 108. In some embodiments, a conductive support 108 can support a vehicle 102 for travel upon the conductive support 108 (e.g., mechanically supporting a vehicle 102 on a rail). In some embodiments, a vehicle 102 travels along a conductive support 108, but is not necessarily mechanically supported by the conductive support 108. In some embodiments, the translating contact 116 may be in direct physical contact with the conductive support 108, and the vehicle 102 may be electrically coupled with the conductive support 108 through the physical contact between the translating contact 116 and the conductive support 108. However, in other embodiments, a translating contact 116 does not necessarily contact a conductive support 108, and a vehicle 102 can be electrically coupled with the conductive support 108 without direct physical contact (e.g., using capacitive coupling).

For the purposes of the present disclosure, the term "vehicle" shall be understood to refer to any equipment that moves with respect to its connection to the conductive support 108. For example, in the case of the robot arm described with reference to FIG. 1, the robot arm vehicle 102 travels along a rail configured as a conductive support 108. As described with reference to FIG. 2, a crane vehicle 102 travels along a conductive support 108, and the connection between the conductive support rail and the crane may be used to replace, for example, a festoon. As described with reference to FIG. 3, a rotary pallet table vehicle 102 on a transfer manufacturing machine supports multiple workpieces for machining at different stations (e.g., for drilling operations). The rotary pallet table vehicle 102 travels along a conductive support 108 that remains stationary while a rotating structure connected to the table vehicle moves the table along and around the stationary support structure at a center pivot location. Together, the rotating structure connected to the table and the stationary structure of the conductive support 108 form a slip ring, which allows power and electrical signals to be transmitted between the stationary structure and the rotating structure. As described herein, the slip ring can be mounted above or beneath the table to provide power and control signals to work holdings mounted to the table. The energy transmission and control system 100 may be used to reduce the number of data signal circuits that would otherwise be used in a slip ring in a typical system. For example, control signals may be sent over power circuits used to power motors and/or work holding devices.

Figure 4:
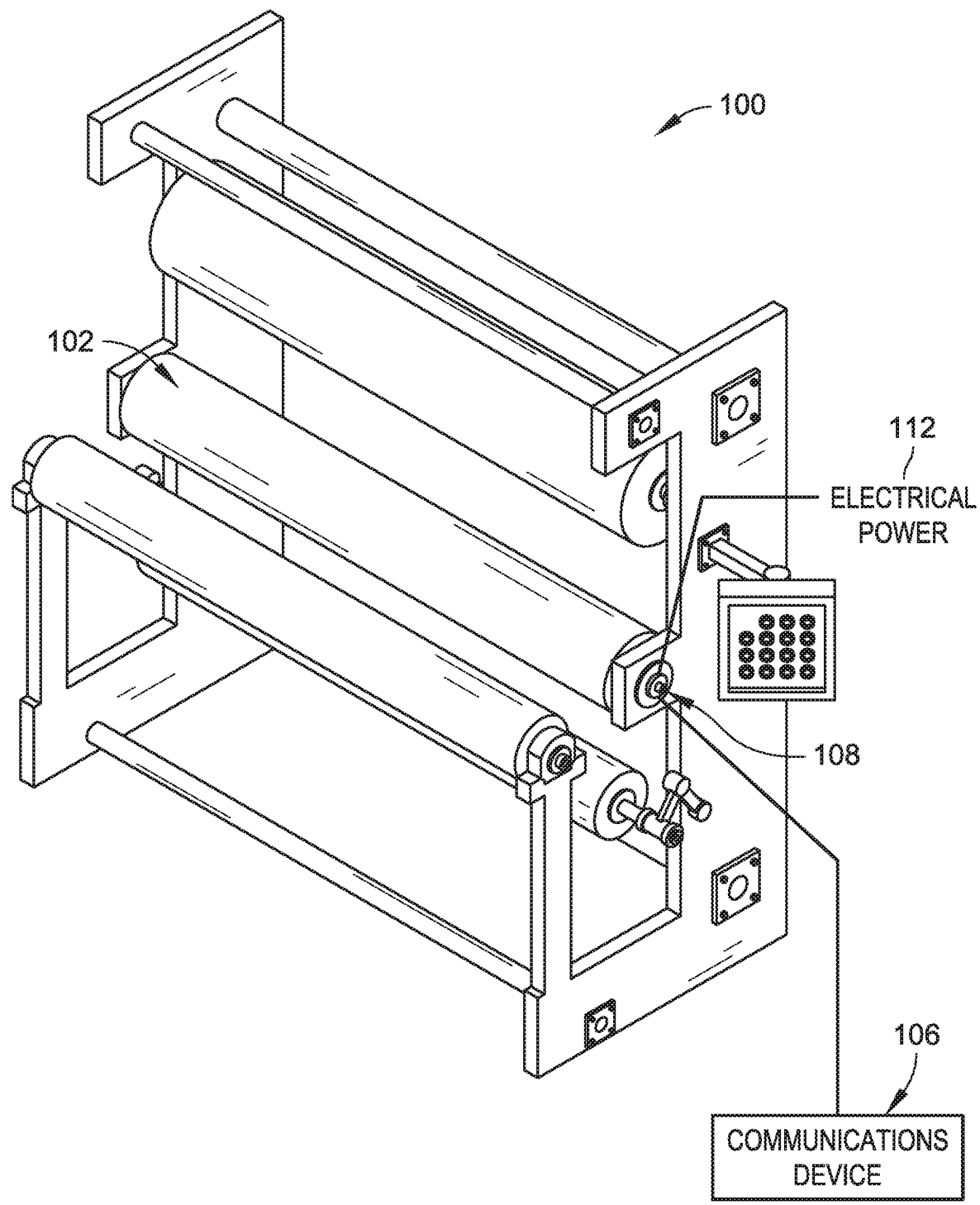
FIG. 4 is another diagrammatic illustration of an energy transmission and control system in accordance with example embodiments of the present disclosure.
Figure 5:
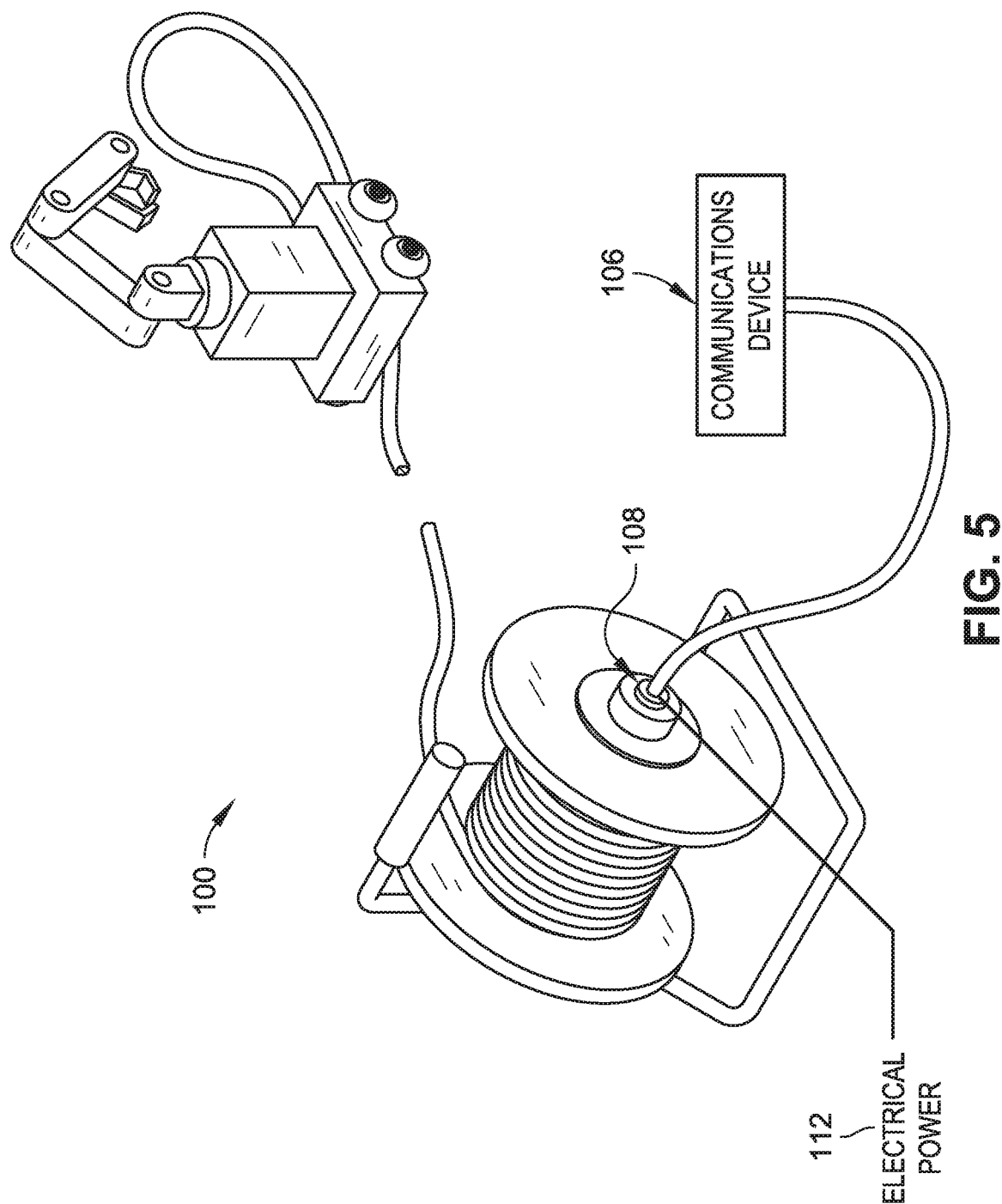
FIG. 5 is a further diagrammatic illustration of an energy transmission and control system in accordance with example embodiments of the present disclosure.

As described with reference to FIG. 4, a transfer machine includes a heated rolling lamination drum vehicle 102. The drum vehicle 102 travels along a conductive support 108 that remains stationary while a rotor connected to the drum vehicle moves the drum along and around a conductive support bearing at a pivot. Together, the rotor connected to the drum and the stationary bearing structure of the conductive support 108 form a slip ring. The slip ring can provide current for heaters in the drum, and data signal circuits for thermocouple measurements. As described herein, the energy transmission and control system 100 can reduce the number of conductors that would otherwise be used in a slip ring in a typical system (e.g., by removing data signal circuits). For instance, thermocouple signals may be sent over the power circuits used for the heating elements. In another example, a center pivot irrigation vehicle (not shown) can be connected to a conductive support structure (e.g., at a slip ring) for transmitting power and electrical signals between the center pivot structure and the irrigation equipment. With reference to FIG. 5, a mobile robotics platform is connected to a cable reel vehicle 102, where a drum of the cable reel vehicle 102 travels along a conductive support 108 that remains stationary while a rotating structure connected to the drum moves along and around a conductive support bearing structure at a pivot. In some embodiments, a mobile platform vehicle 102 may also travel along a conductive support 108 configured as a cable that remains stationary with respect to the platform, and power and electrical signals may be transmitted between the stationary cable and the mobile platform (e.g., using capacitive coupling).

In embodiments of the disclosure, the electrical circuit established between the power supply 112 and the vehicle 102 through the conductive support 108 is configured to transmit a communications signal at a low frequency (e.g., at about five hundred kilohertz (500 kHz) or less in some embodiments) along with electrical power delivered to power the vehicle 102. For example, the communications signal may be transmitted at a frequency of between about five kilohertz (5 kHz) and about five hundred kilohertz (500 kHz), e.g., at about thirty-two kilohertz (32 kHz), sixty-four kilohertz (64 kHz), one hundred kilohertz (100 kHz), and so forth. As described herein, a low frequency or frequency range may be selected to avoid or minimize interference with radio equipment, variable frequency drive (VFD) equipment, and so forth. Thus, an energy transmission and control system 100 may be implemented using a narrowband power line carrier, having slower data rates and/or higher immunity, e.g., with respect to broadband communications systems. Further, in some embodiments, an energy transmission and control system 100 may employ impedance matching to maintain signal strength and/or signal integrity. However, electrical power delivered to power the vehicle 102 through the same conductive support 108 configured to transmit the low frequency communications signals is provided by way of example and is not meant to limit the present disclosure. In other embodiments, an energy transmission and control system 100 can include multiple conductive supports 108 (e.g., one or more conductive supports 108 to deliver communications signals, one or more other conductive supports 108 to deliver power to power the vehicle 102, and so forth), as described with reference to FIG. 1.

In embodiments, communications signals transmitted between the between the power supply 112 and the vehicle 102 through the conductive support 108 may be transmitted using various frequency bands, various modulation methods, and various communication modes (e.g., communications modem standards and protocols). Examples of such frequency bands include, but are not necessarily limited to, one or more of the following: European Committee for Electrotechnical Standardization (CENELEC) standards (e.g., at frequencies ranging between about three kilohertz (3 kHz) and about one hundred forty-eight and one-half kilohertz (148.5 kHz)), Association of Radio Industries and Businesses (ARIB) standards (e.g., at frequencies ranging between about one hundred and fifty-five kilohertz (155 kHz) and about four hundred and three kilohertz (403 kHz)), Federal Communications Commission (FCC) standards (e.g., at frequencies ranging between about one hundred and fifty-five kilohertz (155 kilohertz) and about four hundred and eighty-seven kilohertz (487 kHz)), and so forth.

Examples of such modulation methods include, but are not necessarily limited to, one or more of the following: orthogonal frequency-division multiplexing (OFDM), frequency-shift keying (FSK), binary phase-shift keying (BPSK), and so forth. Examples of such communication modes include, but are not necessarily limited to, one or more of the following: PRIME, G3-PLC, IEEE 1901.2, Proprietary XXR, and so forth. In some embodiments, multiple communication modes and/or frequency bands may be supported by an energy transmission and control system 100.

For instance, communications signals transmitted between the power supply 112 and the vehicle 102 through the conductive support 108 may be transmitted at frequencies ranging between about 5 kHz, 10 kHz, 20 kHz, 30 kHz, 40 kHz, 50 kHz, 60 kHz, 70 kHz, 80 kHz, 90 kHz, 100 kHz, 110 kHz, 120 kHz, 130 kHz, 140 kHz, 150 kHz, 160 kHz, 170 kHz, 180 kHz, 190 kHz, 200 kHz, 210 kHz, 220 kHz, 230 kHz, 240 kHz, 250 kHz, 260 kHz, 270 kHz, 280 kHz, 290 kHz, 300 kHz, 310 kHz, 320 kHz, 330 kHz, 340 kHz, 350 kHz, 360 kHz, 370 kHz, 380 kHz, 390 kHz, 400 kHz, 410 kHz, 420 kHz, 430 kHz, 440 kHz, 450 kHz, 460 kHz, 470 kHz, 480 kHz, and 490 kHz and about 10 kHz, 20 kHz, 30 kHz, 40 kHz, 50 kHz, 60 kHz, 70 kHz, 80 kHz, 90 kHz, 100 kHz, 110 kHz, 120 kHz, 130 kHz, 140 kHz, 150 kHz, 160 kHz, 170 kHz, 180 kHz, 190 kHz, 200 kHz, 210 kHz, 220 kHz, 230 kHz, 240 kHz, 250 kHz, 260 kHz, 270 kHz, 280 kHz, 290 kHz, 300 kHz, 310 kHz, 320 kHz, 330 kHz, 340 kHz, 350 kHz, 360 kHz, 370 kHz, 380 kHz, 390 kHz, 400 kHz, 410 kHz, 420 kHz, 430 kHz, 440 kHz, 450 kHz, 460 kHz, 470 kHz, 480 kHz, 490 kHz, and 500 kHz.

Figure 6:
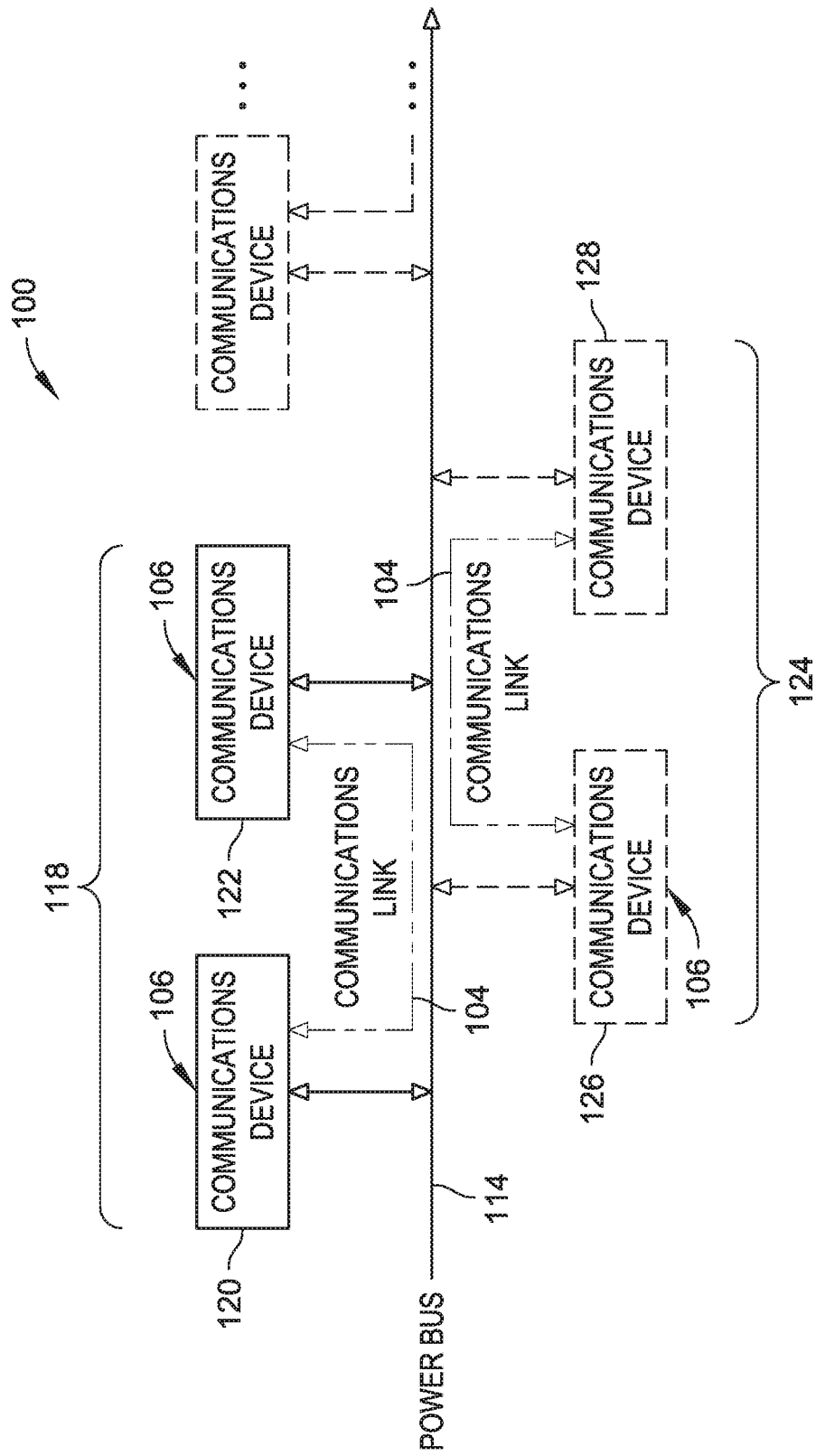
FIG. 6 is a diagrammatic illustration of an energy transmission and control system including multiple groups of communications devices mated together in accordance with example embodiments of the present disclosure.

Referring now to FIG. 6, in some embodiments, a first group of two or more communications devices 106 can communicate via the power bus 114 over a virtual communication link where one communications device in a first group 118 can be configured as a first master device 120 and another communications device (or communications devices) can be configured as a first slave device 122 to the first master device 120. Further, a communications device in a second group 124 can be configured as a second master device 126 and another communications device (or communications devices) can be configured as a second slave device 128 to the second master device 126. Each group of master and slave device/devices can be set to share a common communications channel, where each pair or group of mated devices can communicate over a different (e.g., unique) set of frequency carriers to avoid unintended interaction between groups. In some embodiments, a communications device can be configured as a slave device to more than one master device. Further, the relationship of one communications device with respect to another communications device as a master device and/or a slave device may be context based. For example, a first communications device may be a slave to a second communications device in one context, while the second communications device may itself be a slave to the first communications device in a different context.

In some embodiments, four (4) narrow frequency carriers can be used for each group of communications devices 106 and can be modulated together, e.g., providing carrier redundancy. However, it should be noted that four (4) carriers are provided by way of example and are not meant to limit the present disclosure. In other embodiments, more or fewer than four (4) frequency carriers may be used for a particular group of groups of communications devices 106. Further, in some embodiments, a frequency-division multiplexing (FDM) scheme, such as orthogonal FDM (OFDM) or another multiplexing scheme, may be used to provide many (e.g., hundreds) of carrier frequencies. In some embodiments, a narrowband power line communications (NB-PLC) scheme that uses OFDM modulation and resides in a frequency band from one hundred and fifty-five kilohertz (155 kHz) to four hundred and eighty-seven kilohertz (487 kHz) may be used (e.g., as described in IEEE standard 1901.2). However, this frequency band is provided by way of example and is not meant to limit the present disclosure. In other embodiments, one or more other frequency bands or series of frequency bands (e.g., as set aside for power line communications) may be used. However, a higher frequency band as described herein may be desirable for noise immunity in an industrial environment (e.g., where VFD noise can be a primary concern). In this example, data rates may be comparatively low (e.g., about five hundred kilobits per second (500 kbps)) and may vary depending upon noise in the environment. It should also be noted that one or more communications devices 106 may switch between different frequencies, ranges of frequencies, and/or sets of frequencies, e.g., to communicate with devices in another group. In some embodiments, other communications schemes may also be used, including, but not necessarily limited to: frequency-shift keying (FSK), binary phase-shift keying (BPSK), and so forth.

Figure 7:
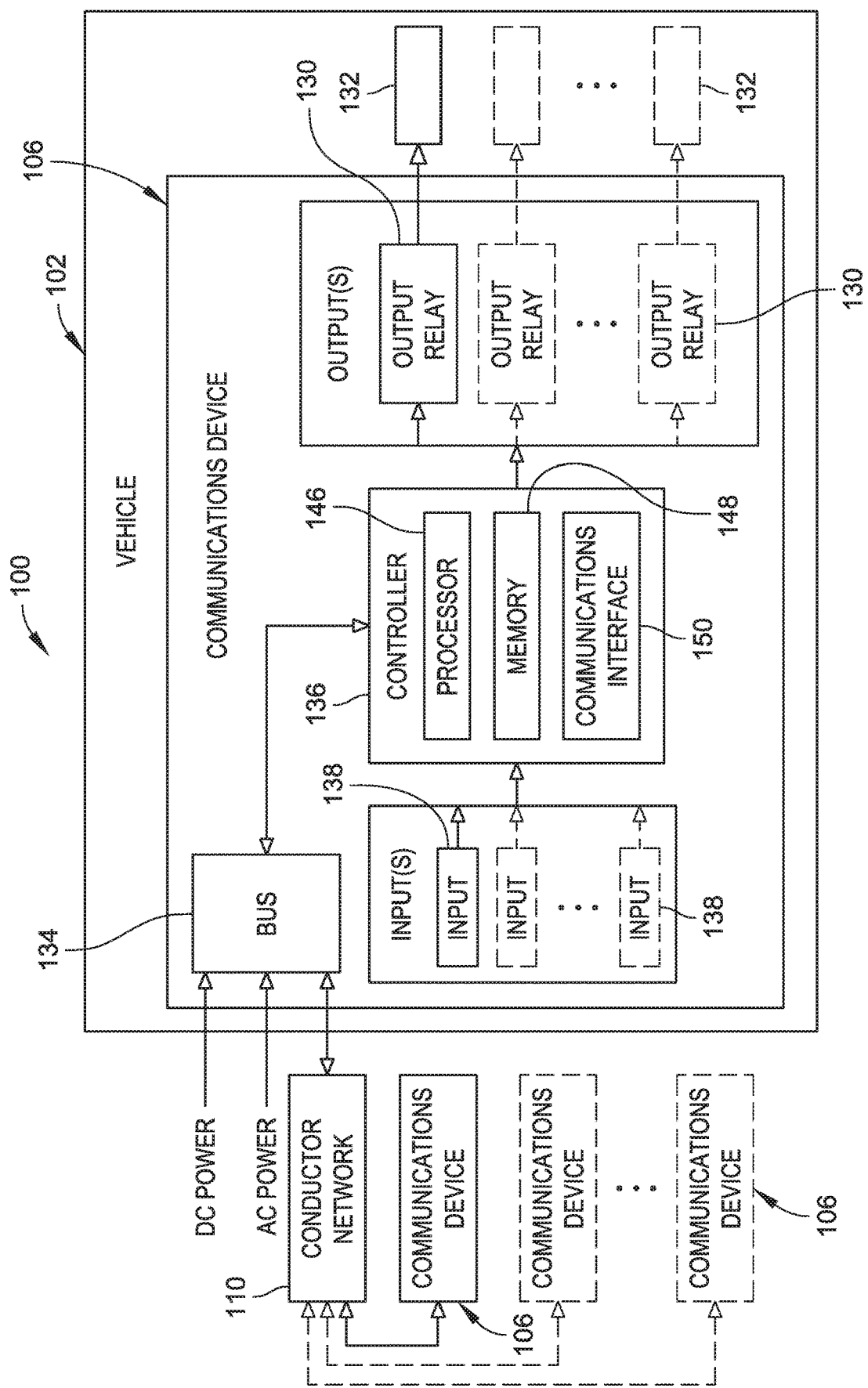
FIG. 7 is a diagrammatic illustration of an energy transmission and control system including multiple groups of communications devices in accordance with example embodiments of the present disclosure.
Figure 8:
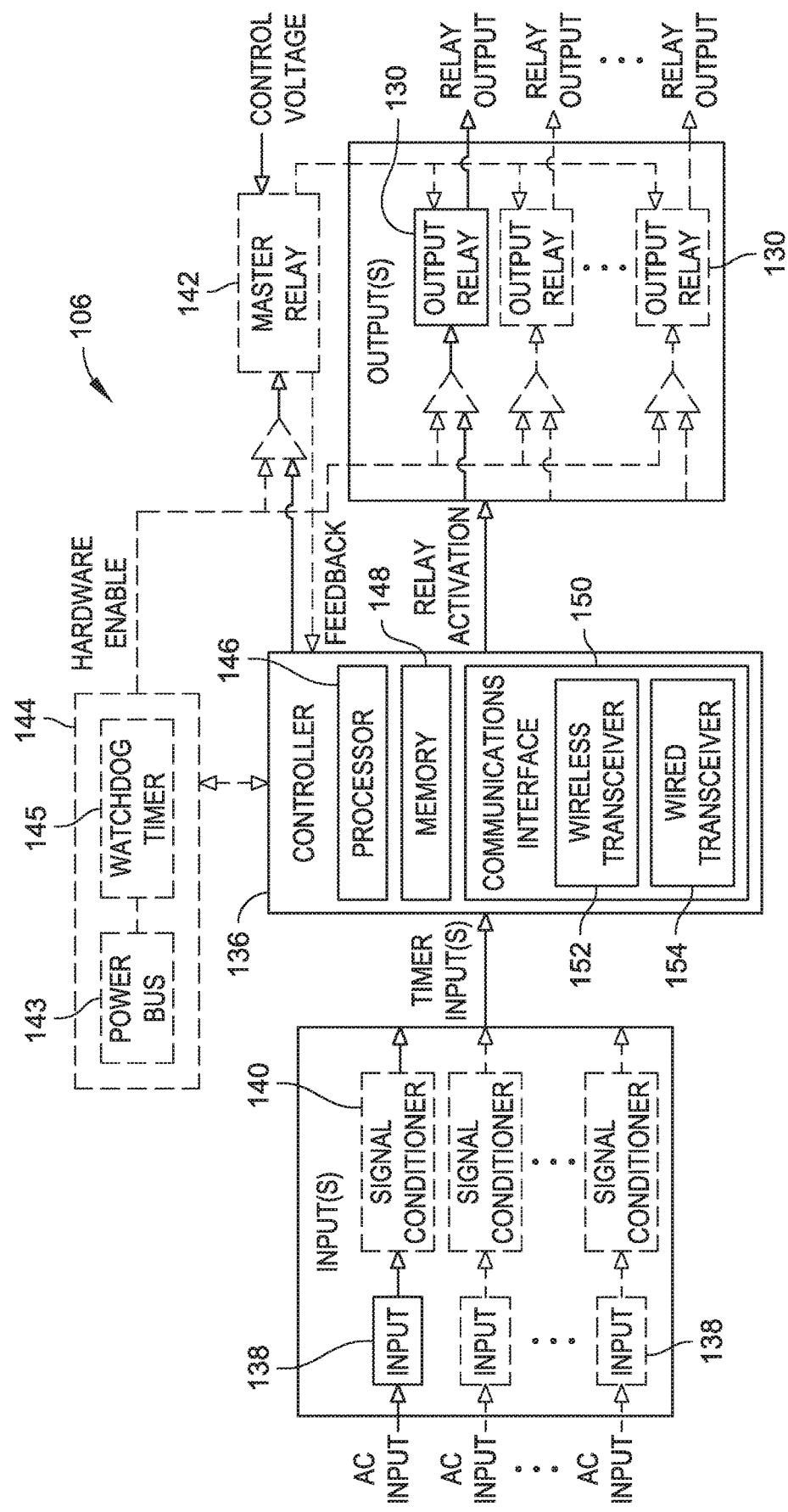
FIG. 8 is a diagrammatic illustration of a communications device for an energy transmission and control system, such as the energy transmission and control systems illustrated in FIGS. 1 through 7, in accordance with example embodiments of the present disclosure.

With reference to FIGS. 7 and 8, a communications device 106 may include one or more switches (e.g., output relays 130) for selectively transmitting electrical energy from the power supply 112 to one or more discrete electrically powered elements or subsystems of a vehicle 102, such as motors 132 or other electrically powered devices. As described herein, an output relay 130 can be defined as an electrical device, which may include, for instance, an electromagnet, that can be activated by a current or signal in one circuit to open or close another circuit. For example, one or more output relays 130 can be included with a communications device 106 and connected to direct current (DC) and/or AC electrical power supplied to the communications device 106 and/or to electrical power supplied from the conductor network 110. The power can be distributed by the communications device 106 using, for example, a bus 134 and/or another power distribution mechanism in the communications device 106.

A controller 136 can be operatively coupled to the output relays 130 and configured to receive communications signals transmitted through the conductive support 108 and to operate the output relays 130 to selectively transmit electrical energy from the power supply 112 to discrete electrically powered elements or subsystems of the vehicle 102, such as a motor 132. In this manner, inputs 138 (e.g., AC inputs) can be mirrored by output relays 130 to produce outputs that would otherwise come from festoons or other actual physical layer connections. Thus, the output relays 130 can be used to start and stop various motors 132, change the direction of a vehicle 102, change the speed of a vehicle 102, activate a light on a vehicle 102, activate a horn, facilitate limit switch and/or position sensing functionality, and so forth. However, it should be noted that output relays 130 are provided by way of example and are not meant to limit the present disclosure. In other embodiments, other switches and/or output devices can be used to mirror inputs and provide virtual physical layer connections 104 between communications devices 106. In embodiments of the disclosure, one or more inputs 138 can be connected to a controller 136 by a connection that may include a signal conditioner 140. As described herein, the inputs 138 can include, but are not necessarily limited to: AC inputs, DC inputs, analog voltage inputs, analog current inputs, serial communications inputs, and so forth. The outputs of the energy transmission and control system 100 will then mirror the inputs 138.

In some embodiments, a communications device 106 can include one or more master relays 142, such as one or more master relays with force guided contacts, to move the various output relays 130 to a default state (e.g., in an unintended or unanticipated operational condition). Each of the master relays 142 may be connected to a different voltage supply (e.g., one to a twenty-four volt (24 V) DC voltage supply, one to a two hundred and fifty volt (250 V) AC voltage supply, and so on). In some embodiments, multiple groups (e.g., four (4) groups or a different number of groups) of output relays 130 may be provided. The communications device 106 may also include watchdog functionality, such as a watchdog timer module 144, which may be implemented in software, firmware, and/or hardware (e.g., including a token watchdog circuit chip). The watchdog timer module 144 can be implemented as an electronic timer to detect malfunctions. For example, during the ordinary course of operations, the communications device 106 periodically resets the watchdog timer module 144 to prevent it from timing out. If the watchdog timer module 144 is not reset and times out, the master relay 142 can move the various output relays 130 to the default state. The controller 136 may be configured to restore ordinary operating conditions and/or to move to a safe state until one or more malfunctions can be addressed by, for example, an operator and/or an automated system or systems of the vehicle 102. The watchdog time module 144 may include a power bus 143 (e.g., a twelve volt (12 V) DC power bus, a twenty-four volt (24 V) DC power bus, and so forth) and a watchdog timer 145, where the power bus 143 is configured to meet the power requirements of the various power submodules. For example, the power bus 143 may be a power management integrated circuit (PMIC).

In some embodiments, the PMIC and token watchdog may be included in a single IC chip. The PMIC may provide supply voltages for various subsystems of the board. The PMIC may also supervise the voltages to ensure they remain within a desired operational range. For example, if a supply voltage is out of range, a supervision circuit may detect this condition and move the controller 136 to a safe state. The token watchdog can be an independent hardware supervision system for the controller 136. In some embodiments, the controller 136 continuously receives a series of data packets (e.g., tokens) from the watchdog and determines an appropriate response (e.g., using internal computations). The response is written back to the watchdog within a given timeout period and in a predetermined order. Internal controller faults that disrupt this process result in watchdog errors, which cause the controller 136 to move to the safe state. In this manner, the computational process can be used to detect subtle controller malfunctions that could otherwise compromise the operation of an energy transmission and control system 100.

In embodiments of the disclosure, a system 100, including some or all of its components, can operate under computer control. For example, a processor can be included with or in a system 100 to control the components and functions of systems 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the systems 100. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

The controller 136 can include a processor 146, a memory 148, and a communications interface 150. The processor 146 provides processing functionality for the controller 136 and can include any number of processors, micro-controllers, or other processing systems, and resident or external memory for storing data and other information accessed or generated by the controller 136. The processor 146 can execute one or more software programs that implement techniques described herein. The processor 146 is not limited by the materials from which it is formed or the processing mechanisms employed therein and, as such, can be implemented via semiconductor(s) and/or transistors (e.g., using electronic integrated circuit (IC) components), and so forth. In some embodiments, the controller 136 can be implemented as a microcontroller (MCU, microcontroller unit).

The memory 148 is an example of tangible, computer-readable storage medium that provides storage functionality to store various data associated with operation of the controller 136, such as software programs and/or code segments, or other data to instruct the processor 146, and possibly other components of the controller 136, to perform the functionality described herein. Thus, the memory 148 can store data, such as a program of instructions for operating the system 100 (including its components), and so forth. It should be noted that while a single memory 148 is described, a wide variety of types and combinations of memory (e.g., tangible, non-transitory memory) can be employed. The memory 148 can be integral with the processor 146, can comprise stand-alone memory, or can be a combination of both.

The memory 148 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In some embodiments, the memory 148 can be implemented using synchronous dynamic random-access memory (SDRAM). In implementations, the controller 136 and/or the memory 148 can include removable integrated circuit card (ICC) memory, such as memory provided by a subscriber identity module (SIM) card, a universal subscriber identity module (USIM) card, a universal integrated circuit card (UICC), and so on.

The communications interface 150 is operatively configured to communicate with components of the system 100. For example, the communications interface 150 can be configured to transmit data for storage in the system 100, retrieve data from storage in the system 100, and so forth. The communications interface 150 is also communicatively coupled with the processor 146 to facilitate data transfer between components of the system 100 and the processor 146 (e.g., for communicating inputs to the processor 146 received from a device communicatively coupled with the controller 136). It should be noted that while the communications interface 150 is described as a component of a controller 136, one or more components of the communications interface 150 can be implemented as external components communicatively coupled to the system 100 via a wired and/or wireless connection. The system 100 can also comprise and/or connect to one or more input/output (I/O) devices (e.g., via the communications interface 150), including, but not necessarily limited to: a display, a mouse, a touchpad, a keyboard, and so on.

The communications interface 150 and/or the processor 146 can be configured to communicate with a variety of different networks, including, but not necessarily limited to: a wide-area cellular telephone network, such as a 3 G cellular network, a 4 G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 150 can be configured to communicate with a single network or multiple networks across different access points. In some embodiments, the communications interface 150 can include one or more wireless transceivers 152, wired transceivers 154, and so forth. In some embodiment, one or more transceivers can be used for data logging.

Figure 9:
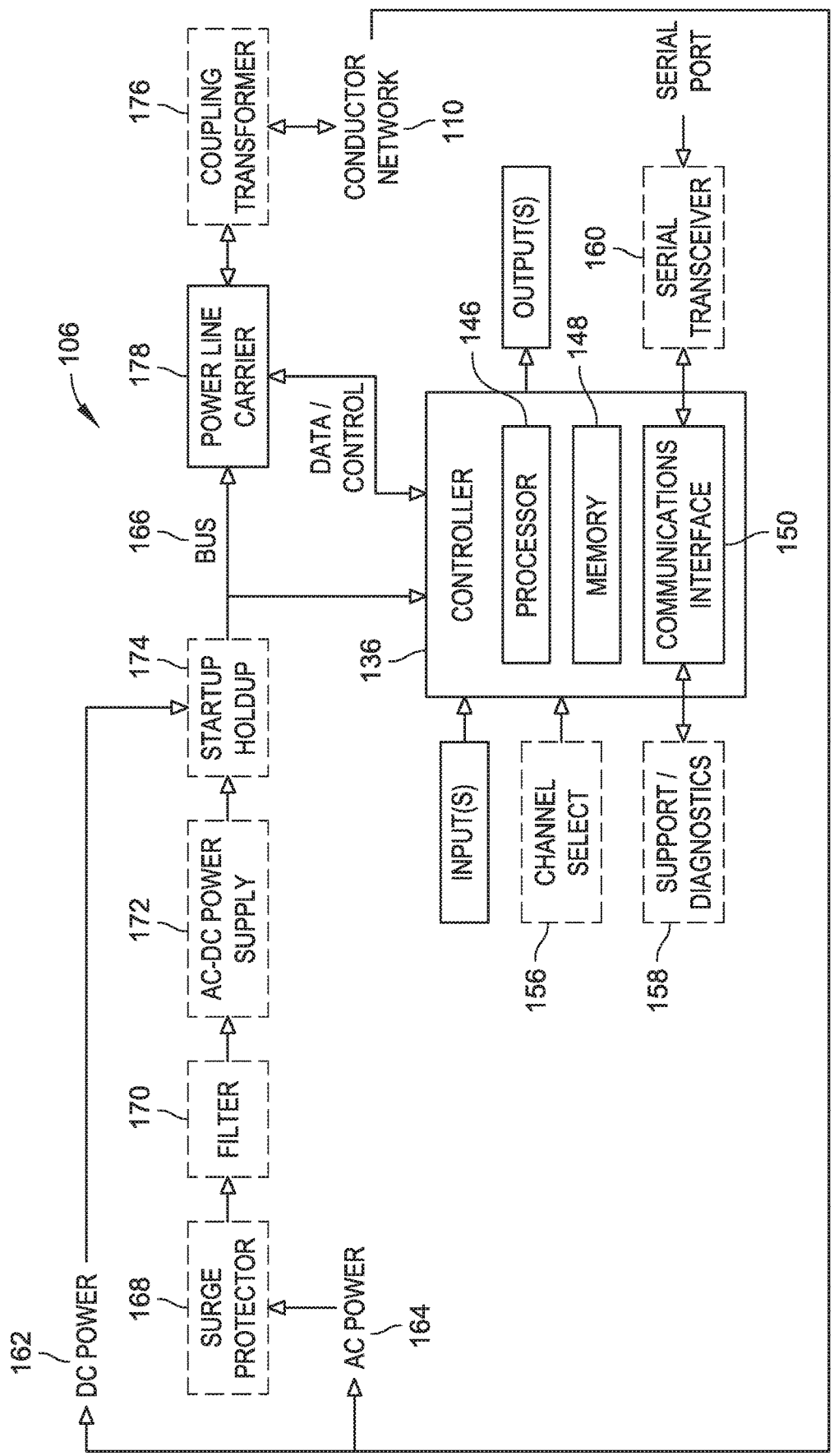
FIG. 9 is a diagrammatic illustration of a communications device for an energy transmission and control system, such as the energy transmission and control systems illustrated in FIGS. 1 through 7, in accordance with example embodiments of the present disclosure.

Referring now to FIG. 9, the controller 136 can be coupled with a channel select module 156 (e.g., a dual in-line package (DIP) switch or another selector) that defines a common communications channel over which each pair or group of mated devices communicates using a particular frequency carrier or set of frequency carriers. However, a hardware switching device, such as a DIP switch, is provided by way of example and is not meant to limit the present disclosure. The channel select module 156 can be implemented as a software switching device, a firmware switching device, and so forth. The controller 136 can also be coupled with one or more support and/or diagnostics modules 158 using communications interfaces that include, but are not necessarily limited to: Ethernet ports, SD memory card sockets, USB ports, Bluetooth interfaces, flash memory interfaces, remote radio frequency links, and so forth (e.g., implemented as one or more wireless transceivers 152, wired transceivers 154, and so on, as described with reference to FIG. 8). In some embodiments, the communications interface 150 can also be configured to couple with a serial transceiver 160.

The controller 136 of a communications device 106 may implement various communications schemes when communicating with, for example, a second controller 136 of another communications device 106. For instance, a communications device 106 can employ forward error correction, error detection, various timing techniques, status confirmation, instruction confirmation, and/or other techniques to provide deterministic information exchange on the conductor network 110. In some embodiments, communications devices 106 may also transmit and/or receive packetized data on the conductor network 110. For example, communications between components of an energy transmission and control system 100 can be implemented using one or more comparatively low-speed communications protocols, such as a low-speed Ethernet protocol (e.g., an RS-485 standard protocol) for communications over long distances and/or in electrically noisy environments. Additionally, communications in an energy transmission and control system 100 can be implemented using one or more protocols to establish low-latency and/or loss-tolerating connections, such as a user datagram protocol (UDP) communications protocol.

The controller may be coupled with the conductor network 110 and supplied with DC power 162, AC power 164, and so forth via a bus 166. In some embodiments, the AC power 164 can be connected to the bus 166 using a surge protector 168, a filter 170, an AC-DC power supply 172, and/or a startup/holdup module 174. The startup/holdup module 174 can include one or more capacitors for reducing and/or minimizing the effects of short term (e.g., momentary) power disruptions and/or disconnections. The conductor network 110 may be connected to the bus 166 using, for instance, a coupling transformer 176 and a power line carrier (PLC) 178. In some embodiments, the PLC 178 may be implemented using a system on a chip (SoC) device. As described herein, the DC power 162 may employ a voltage between about nineteen volts (19 V) and about thirty volts (30 V), the AC power 164 may employ a voltage between about ninety volts (90 V) and about two hundred and sixty-four volts (264 V), and the conductor network 110 may employ a voltage of about four hundred and eighty volts (480 V) AC. However, it should be noted that these voltages ranges are provided by way of example and are not meant to limit the present disclosure. In other embodiments, the DC power 162, the AC power 164, and/or the conductor network 110 may employ different voltages or voltage ranges.

In some embodiments, energy transmission and control systems 100 can implement various filtering schemes to filter unwanted interference while still allowing for communications in multiple desired frequency ranges. For example, a filter 170 can operate to allow lower frequency communications (e.g., in frequency ranges for narrow band communications as described herein) and comparatively higher frequencies (e.g., in frequency ranges for broadband communications). For instance, in some embodiments, filtering can be performed to allow for frequencies between about one hundred kilohertz (100 kHz) and 100 megahertz (100 MHz).

Figure 10:
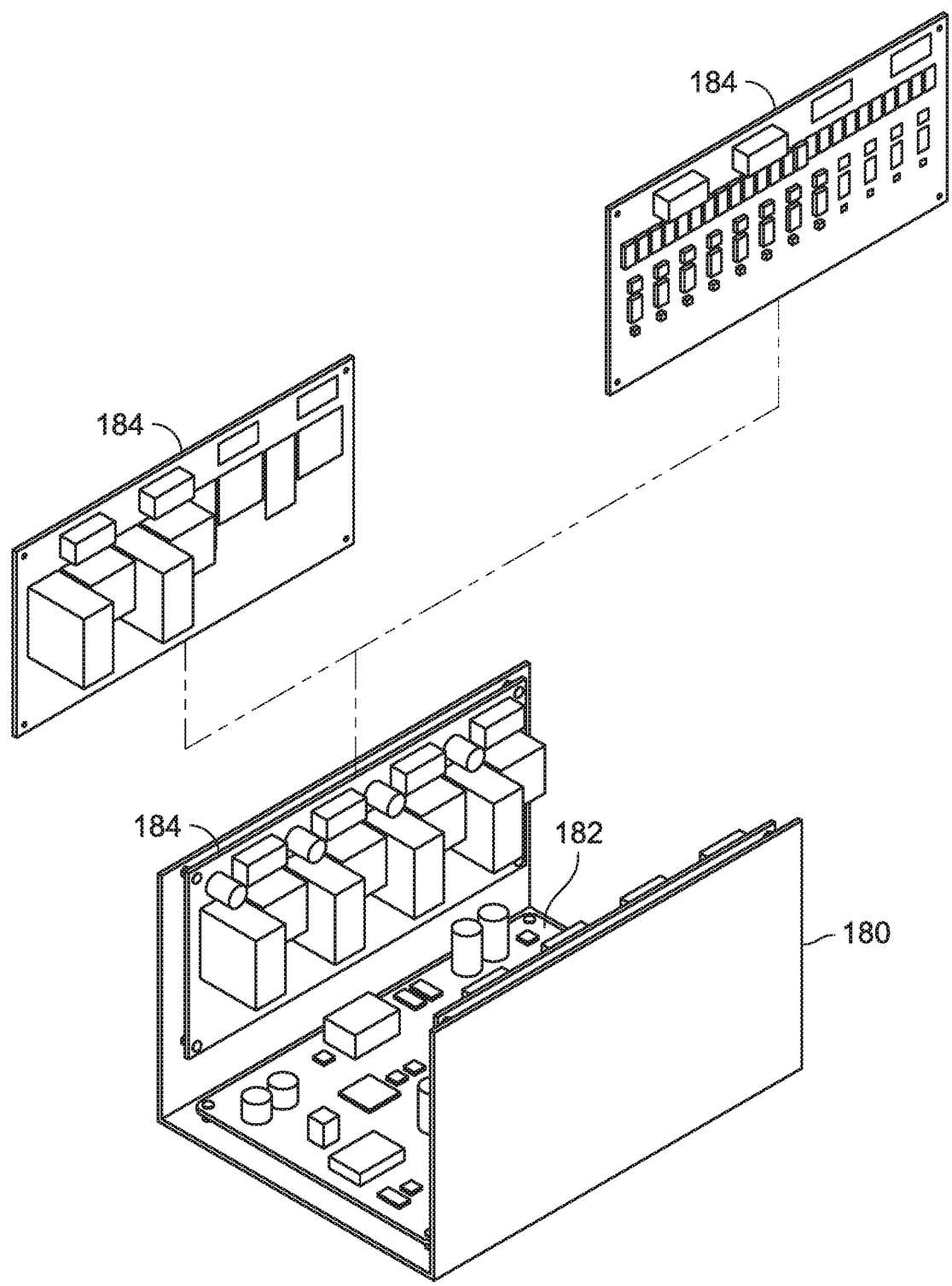
FIG. 10 is a diagrammatic illustration of modular hardware for an energy transmission and control system, such as the energy transmission and control systems shown in FIGS. 1 through 9, in accordance with example embodiments of the present disclosure.

With reference to FIG. 10, various components of the energy transmission and control systems 100 can be implemented using modular hardware. For example, an enclosure 180 can be used to mount system components, such as a main circuit board 182 with the ability to connect to auxiliary (e.g., daughter) circuit boards 184. In embodiments of the disclosure, the daughter boards may include different numbers of inputs and outputs (e.g., four (4) inputs, eight (8) inputs, sixteen (16) inputs, four (4) outputs, eight (8) outputs, sixteen (16) outputs, and so forth). Different daughter boards can be exchanged to vary the number of inputs as desired. Further, in some embodiments, the auxiliary/daughter circuit boards 184 may be mounted remotely (e.g., connected by other cabling). One ore more resistors may then be used by the energy transmission and control systems 100 to determine how many inputs may be available within the energy transmission and control systems 100. For example, the state of a resistor may indicate an available number of inputs.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A control system for transmitting electrical energy to power and control a vehicle over a virtual physical layer established between the vehicle, a conductive support for powering and supporting the vehicle, and a first controller, the control system comprising:
   a conductive support to electrically couple with a power supply, the power supply to supply electrical energy to the conductive support;
   a first controller to communicatively couple with the conductive support, the first controller to receive an input signal and transmit a communications signal indicative of the input signal with the electrical energy supplied over the conductive support; and
   a vehicle to be supported by the conductive support, the vehicle to travel along the conductive support and to receive electrical energy from the power supply as part of an electrical circuit to be established between the power supply and the vehicle through the conductive support, the vehicle including:
      a translating contact for electrically coupling the vehicle to the conductive support to receive electrical energy from the power supply,
      a plurality of discrete electrically powered elements or subsystems to be powered and controlled by the electrical energy received from the power supply,
      a relay for selectively transmitting electrical energy from the power supply to power at least one of the plurality of discrete electrically powered elements or subsystems of the vehicle, and
      a second controller operatively coupled to the relay and configured to receive the communications signal from the first controller transmitted with the electrical energy supplied over the conductive support and operate the relay to mirror the input signal received by first controller to produce an output signal for selectively powering and thereby controlling the at least one of the plurality of discrete electrically powered elements or subsystems of the vehicle, providing a virtual physical layer.

2. The control system as recited in claim 1, wherein the electrical circuit is configured to transmit the communications signal at a low frequency of about five hundred kilohertz (500 kHz) or less.

3. The control system as recited in claim 1, wherein the conductive support comprises at least one of a conductive rail, a conductor bar, a reel, a slip ring, or a cable with a reduced number of conductors.

4. The control system as recited in claim 1, wherein the vehicle is electrically coupled with the conductive support through physical contact with the conductive support.

5. The control system as recited in claim 1, wherein the vehicle is electrically coupled with the conductive support through capacitive coupling.

6. The control system as recited in claim 1, wherein the translating contact comprises at least one of a sliding collector shoe, or a rolling collector.

7. The control system as recited in claim 1, wherein the first controller is coupled with at least one of a limit switch or a position sensor for initiating transmission of the communications signal in response to a signal from the limit switch or the position sensor.

8. The control system as recited in claim 1, wherein the first controller is configured to communicate via the conductive support using a low-speed Ethernet protocol.

9. A control system for transmitting electrical energy to power and control a vehicle over a virtual physical layer established between the vehicle, a conductive support for powering and supporting the vehicle, and a first controller, the control system comprising:
   a conductive support to electrically couple with a power supply, the power supply to supply electrical energy to the conductive support;
   a first controller to communicatively couple with the conductive support, the first controller to receive an input signal and transmit a communications signal indicative of the input signal with the electrical energy supplied over the conductive support; and
   a vehicle to be supported by the conductive support, the vehicle to travel along the conductive support and to receive electrical energy from the power supply as part of an electrical circuit to be established between the power supply and the vehicle through the conductive support, the vehicle including:
      a translating contact for electrically coupling the vehicle to the conductive support to receive electrical energy from the power supply,
      a plurality of discrete electrically powered elements or subsystems to be powered and controlled by the electrical energy received from the power supply,
      a switch for selectively transmitting electrical energy from the power supply to power at least one of the plurality of discrete electrically powered elements or subsystems of the vehicle, and
      a second controller operatively coupled to the switch and configured to receive the communications signal from the first controller transmitted with the electrical energy supplied over the conductive support and operate the switch to mirror the input signal received by the first controller to produce an output signal for selectively powering and thereby controlling the at least one of the plurality of discrete electrically powered elements or subsystems of the vehicle, providing a virtual physical layer.

10. The control system as recited in claim 9, wherein the electrical circuit is configured to transmit the communications signal at a low frequency of about five hundred kilohertz (500 kHz) or less.

11. The control system as recited in claim 9, wherein the conductive support comprises at least one of a conductive rail, a conductor bar, a reel, a slip ring, or a cable with a reduced number of conductors.

12. The control system as recited in claim 9, wherein the vehicle is electrically coupled with the conductive support through physical contact with the conductive support.

13. The control system as recited in claim 9, wherein the vehicle is electrically coupled with the conductive support through capacitive coupling.

14. The control system as recited in claim 9, wherein the translating contact comprises at least one of a sliding collector shoe, or a rolling collector.

15. The control system as recited in claim 9, wherein the first controller is coupled with at least one of a limit switch or a position sensor for initiating transmission of the communications signal in response to a signal from the limit switch or the position sensor.

16. The control system as recited in claim 9, wherein the first controller is configured to communicate via the conductive support using a low-speed Ethernet protocol.

17. A vehicle for controlling over a virtual physical layer established between the vehicle, a conductive support for powering and supporting the vehicle, and a first controller, the vehicle comprising:
a translating contact for electrically coupling the vehicle to a conductive support to receive electrical energy from a power supply electrically coupled with the conductive support, the vehicle to be supported by the conductive support, the vehicle to travel along the conductive support and to receive the electrical energy from the power supply as part of an electrical circuit to be established between the power supply and the vehicle through the conductive support;
a plurality of discrete electrically powered elements or subsystems to be powered and controlled by the electrical energy received from the power supply;
a relay for selectively transmitting electrical energy from the power supply to power at least one of the plurality of discrete electrically powered elements or subsystems; and
a second controller operatively coupled to the relay and configured to receive a communications signal from a first controller transmitted with the electrical energy supplied over the conductive support, the first controller communicatively coupled with the conductive support to receive an input signal and transmit a communications signal indicative of the input signal with the electrical energy supplied over the conductive support, the second controller configured to operate the relay to mirror the input signal received by the first controller to produce an output signal for selectively powering and thereby controlling the at least one of the plurality of discrete electrically powered elements or subsystems, providing a virtual physical layer.

18. The vehicle as recited in claim 17, wherein the electrical circuit is configured to transmit the communications signal at a low frequency of about five hundred kilohertz (500 kHz) or less.

19. The vehicle as recited in claim 17, wherein the vehicle is electrically coupled with the conductive support through physical contact with the conductive support.

20. The vehicle as recited in claim 17, wherein the vehicle is electrically coupled with the conductive support through capacitive coupling.

* * * * *